United States Patent
Haller

(10) Patent No.: US 6,752,573 B2
(45) Date of Patent: Jun. 22, 2004

(54) MACHINING CENTER

(76) Inventor: Hubert Haller, Hegaustrasse 49, 78647 Trossingen (DE)

(*) Notice: Subject to any disclaimer, the term of this patent is extended or adjusted under 35 U.S.C. 154(b) by 81 days.

(21) Appl. No.: 10/221,906

(22) PCT Filed: Mar. 14, 2001

(86) PCT No.: PCT/EP01/02856

§ 371 (c)(1),
(2), (4) Date: Sep. 13, 2002

(87) PCT Pub. No.: WO01/68314

PCT Pub. Date: Sep. 20, 2001

(65) Prior Publication Data

US 2003/0113182 A1 Jun. 19, 2003

(30) Foreign Application Priority Data

Mar. 15, 2000 (DE) ......................................... 100 12 445

(51) Int. Cl.[7] .............................................. B23Q 1/10
(52) U.S. Cl. .......................... 409/235; 409/134; 409/27; 409/201; 451/1
(58) Field of Search ................................ 409/134, 235, 409/201, 204, 211, 216, 27; 451/451, 452, 455; 408/234, 236; 74/608, 609

(56) References Cited

U.S. PATENT DOCUMENTS

| | | | |
|---|---|---|---|
| 1,420,319 A | * 6/1922 | Kelley | 409/190 |
| RE26,393 E | * 5/1968 | Daugherty | 409/118 |
| 4,589,174 A | * 5/1986 | Allen | 29/33 R |
| 4,981,402 A | * 1/1991 | Krenzer et al. | 409/26 |
| 5,181,898 A | 1/1993 | Piotrowski | |
| 5,310,295 A | * 5/1994 | Palmateer et al. | 409/13 |
| 5,405,222 A | * 4/1995 | Ward | 409/201 |
| 5,580,298 A | * 12/1996 | Stadtfeld | 451/1 |
| 5,800,103 A | * 9/1998 | Stadtfeld et al. | 409/27 |
| 6,623,222 B1 | * 9/2003 | Kroll et al. | 409/235 |

FOREIGN PATENT DOCUMENTS

| | | | | |
|---|---|---|---|---|
| DE | 19507989 A1 | * 9/1996 | ............ | B23Q/1/01 |
| DE | 10027509 A1 | * 12/2001 | ............ | B23Q/1/01 |
| EP | 0 257 965 A2 | 3/1988 | ............ | B44B/1/00 |
| EP | 0 700 751 A1 | 3/1996 | ............ | B24B/3/26 |
| EP | 0 816 012 A1 | 1/1998 | ............ | B23Q/1/01 |
| FR | 2 766 752 | 2/1999 | ............ | B24B/3/16 |
| JP | 61065757 | 4/1986 | ............ | B23Q/39/00 |
| JP | 11/10564 | 4/1999 | ............ | B25J/7/00 |

OTHER PUBLICATIONS

Kuhn, S.; "Zementbeton im Wekzeugmaschinenbau?", Werkstatttechnik, Springer Verlag. Berlin, DE, vol. 80, No. 6, Jun. 1, 1990, pp. 307–310.

Schulz, H.; "Reaktionsharzbeton im Maschinenbau"; Werkstatt und Betrieb, vol. 121, No. 4, Apr. 1988, pp. 291–294.

\* cited by examiner

*Primary Examiner*—Erica Cadugan
*Assistant Examiner*—Dana Ross
(74) *Attorney, Agent, or Firm*—Pendorf & Cutliff

(57) ABSTRACT

The invention relates to a machining center provided with a workpiece machining tool. Said machine tool comprises: an essentially horizontal working plate (10) which is supported by a machine tool stand (2); a workpiece support (20) which is accommodates a workpiece (2) and which is placed on the working plate (10); a machining head (30) which accommodates a machining tool (29) and which is mounted on a vertical machining column (32) that can pivot around a vertical axis (37) by means of a rotary plate (36), said rotary plate being arranged underneath the working plate (10) and integrated in the machine stand (2), and; a first carrying arm (34) for the machining column (32). One end of said carrying arm is connected in a fixed manner to the rotary plate (36), and the other end is laterally guided out over the working plate (10) in such a manner that the machining column (32) mounted there can be pivoted around the working plate (10). A holding device is provided that comprises a bearing (33), which is arranged above the machining head (30) in the axial extension of the axis (37) of the rotary plate (36), and on which a second carrying arm (35) for the machining column (32) is mounted that is joined to said machining column (32).

16 Claims, 4 Drawing Sheets

MACHINING CENTER

BACKGROUND OF THE INVENTION

1. Field of the Invention

The invention concerns a machining center with a workpiece machining tool.

2. Description of the Related Art

The principle of workpiece machining tools such as, for example, tools for grinding, milling, turning etc. of workpieces has long been known. These serve on the one hand for the repair of work tools, that is, for example, for re-sharpening the cutting edges of cutting tools, wherein the cutting geometry should be re-established to the closest extent possible, and on the other hand for processing a raw form, that is, for example, for producing a turned part or for the milling-in of grooves, etc., and complicated milled parts, such as can only be produced using interpolated NC-axis.

This type of workpiece processing machine is generally constructed upon a machine stand, which includes the various construction components necessary for functioning. This includes, first, the working plate which is seated upon the machine stand and-oriented horizontally, which as a rule is dimensioned with high precision and is adapted to having further construction components secured thereto.

A workpiece carrier is seated upon the working plate, which receives the workpiece to be machined. The workpiece carrier is equipped for example with a longitudinal and a transverse support, which permit a rapid adjustment respectively in the longitudinal as well as in the transverse direction. Further, the workpiece spindle integrated in the workpiece carrier and receiving the workpiece is free or coupled with the longitudinal support and here drivable, such that any combination of rotational and advancing movements is achievable.

The machining of the workpiece occurs by means of a machining tool, for example by means of a grinding disk, a miller, a chisel, a drill, etc., which is provided interchangeably on a machining head. Depending upon need the machining head is adjustable along multiple axis, so that a desired contour can be followed. For this, the machining head is mounted on a vertically oriented and height adjustable machining column, wherein the machining column for its part is pivotable about a vertically oriented axis and is provided upon a rotary plate. The rotary plate as a rule is likewise seated upon a working plate. Therein it is positioned adjacent to the workpiece carrier in such a manner that the machining tool can be directed onto the workpiece.

From EP 0 700 751 B1, representative of the state of the art over which the present invention represents an improvement, it is known to seat the rotary disk with the thereupon secured machining column not upon the working plate, but rather to integrated it therebelow in the machine stand so that, in comparison to the arrangement wherein the rotary plate is seated upon the working plate, an unimpeded access to the working area is always possible.

According to EP 0 700 751 B1 the pivot movement of the machining head is made possible by securing the machining column carrying this onto a carrier arm, which at one end is attached to the rotary plate and at the other end extends sideways out from the machine stand in order to be able to receive the machining column.

In order to attempt to achieve a stability similar to the workpiece machining tools in which the rotary disk is seated upon the working plate, the rotary plate is double-mounted. In practice this is realized thereby, that a mounting bolt is provided, which extends centrally through the rotary plate and projects both above and below the rotary plate. Journals are provided at the respective projecting bolt ends, which are supported within the machine stand and/or below the working plate.

A mounting device for a light drill tool guided along an arc is described in U.S. Pat. No. 1,630,528. In order to make possible a wide accessibility to the work area, a frame holding the drill tool is provided, which tool is guided upon arcuate curved tracks provided above this frame via a wheel with a wheel flange, the wheel mounted rotatably, oriented vertically, and guided on the upper side of the frame. In order to prevent a pivoting of the frame mounted on the curved track in the direction radially or as the case may be tangential to the guide trackl, the lower end of the frame holding the drill tool is guided upon a track which is also arcuate shaped below the workpiece. For this purpose, the frame is shaped with a projection at the workpiece facing end. The projecting end of the frame includes rollers mounted rotatably in a vertically oriented axis, wherein respectively two rollers encompass the arc shaped rails, so that the total frame is guided in an arc.

Since the wheel with wheel flange provided on the upper side of the frame can essentially receive or accept only a (limited) force in the vertical direction and the rollers mounted at the lower end of the frame can tolerate or accept a limited force in the radial direction, the mounting device according to U.S. Pat. No. 1,630,528 is suitable only for a machining process in which the tool transmits only small forces upon the workpiece and/or processes with high dimensional tolerances.

Frequently however the stability of the guide arrangement according to U.S. Pat. No. 1,630,528 or even the doubled mounting according to EP 0 700 751 B1 is still not sufficient, particularly not when the machining column is made more stable and/or supplemental construction components such as motors for raising or tilt adjusting of the machining head are incorporated, or when, for example in a milling process, a greater force must be transmitted to the workpiece being machined.

SUMMARY OF THE INVENTION

The invention is thus concerned with the task of developing a workpiece machining tool of the type described in the introduction in such a manner that it is no longer liable to the above-mentioned disadvantages. In particular, a machining center of this type with a workpiece machine tool is to be provided, with which the mounting for the pivotable machining column is to be made even more stable, without losing the compact construction and the unimpeded access to the work area, so that a universal employment is possible.

This problem is solved for a machining center of this type by means of the features indicated in the characterizing portion of claim 1.

Advantageous embodiments and further developments of the invention can be seen from the dependent claims.

The invention is based upon the idea of stably mounting not only the rotating plate, but rather, to provide a further mounting position, which is provided supplementally to the already present journal or bearing, in axial extension on the opposite side of the machining head. In concrete terms, a mounting device is provided which includes a mounting position above the machining head in the axial extended axis of the rotating plate, at which a second carrier arm connected to the machining column is mounted for the machining column. Accordingly, also in this inventive arrangement, the machining column is provided outside of the working plate, whereby the working area is optimally accessible, that is, unimpeded from all sides. Further, by this type of mounting, the ability of the rotary plate to accept loads is substantially increased in comparison to the conventional one-sided double mount.

Thereby the precision of the workpieces being processed can be significantly increased, in particular also in the case that an elevated application pressure is necessary. Further, the machining column can be made more stable and/or serve for mounting supplemental components such as motors for raising and lowering adjustment of the machine head.

In accordance with the present invention, the motor drive of the pivot arm is preferably associated with the first (lower) carrier arm, so that the mounting position of the upper carrier arm is displaceable in the vertical direction. Thereby tolerances which are unavoidable during assembly can be compensated for.

In a particularly preferred embodiment of the invention the mounting device is in the form of a machine frame. This machine frame is preferably so designed, that it essentially encompasses the machine stand, the working plate, the workpiece carrier, the machining tool, the machining head, the machining column, and the rotary plate as well as the first and second carrier arms. Besides the simplified integration of the second mounting point above the machining head along the axial extension of the axis of the rotary plate, such a compact form further exhibits the advantage, that the machining center or as the case may be a separate unit can be transported to the set-up location, without having to provide additional protective devices for the individual machine components. Further, no dirtying of the machine occurs from outside by other machines positioned adjacent thereto, or on the other hand, the particles or shavings produced by processing of the workpiece in the machine itself cannot escape to the outside.

It is further envisioned that the machine frame is comprised of mineral cast components. A particularly advantageous embodiment of the invention envisions that the mineral cast components of the frame are adhered to each other and/or screwed together. The advantage of this embodiment lies in the attainability of an optimal stiffness.

According to a particular preferred embodiment of the invention, the machine framework includes a dismantleable covering with a sliding door. The sliding door makes possible an optimal accessibility to the working area during the working process itself; the easily disassembled covering makes possible the accessibility from the side to the components of the machine for repair and/or service purposes.

An inventive alternative to the above described machine frame is comprised therein, that the framework is in the form of a bridge, which essentially passes over the machine stand, the working plate, the workpiece carrier, the machining tool, the machining head, the machining column, the rotary plate and the first and second carrier arms. Here also it is guaranteed that the second mounting point is integrated in simple mode and manner above the machining head in the axial extension of the axis of the rotary plate. The machining center constructed in this mode and manner further exhibits the advantage that the individual components are on the one hand very simple to produce and on the other hand that the transportation and assembly can be carried out in simple manner.

In accordance with a particularly advantageous variant of this embodiment, a cable channel is provided in the bridge, in which supply lines or the like for this machine, or machines provided in close proximity to this machining center, can be received. Since it is frequently the case that the supply lines for this type of machine or as the case may be machining center must be carried by special carrier or retaining devices, it becomes possible in this case to dispense with a separate device.

In accordance with a further modification of this variant, a housing part is rotatably mounted upon the bridge, which at least partially encompasses the working plate, the workpiece carrier, the machining tool, the machining head, the machining column, the rotary plate and the first and second carrier arms. This housing part functionally corresponds essentially to the sliding door of the above-mentioned variant. It makes possible on the one hand an optimal accessibility of the operating area during the working process itself. It is however, beyond this, made possible, that the working plate, the workpiece carrier, the machining tool, the machining head, the machining column, the rotary plate and the first and second carrier arm are protected from unauthorized access.

Preferably, this rotatably mounted housing part is in the form of a segment of a cylindrical casing, wherein the casing surfaces are essentially oriented vertically. A housing part of this kind is easy to manufacture and is particularly suited to being rotated at least partially into a fixed housing part. This fixed housing part can likewise be in the form a section of a cylindrical casing.

For manufacturing reasons, it is advantageous to produce the bridge of steel. Besides this, a steel bridge ensures high stability of the total device, so that a very precise processing of the work is made possible.

In accordance with the invention it is further envisioned, that the fixed housing part is made of sheet metal and the rotatable mounted housing part is made of MAKROLON (polycarbonate, product of Bayer), glass (fiberglass) or the like. A sheet metal cover has in general the advantage of the low cost of manufacturability, the transparent version of the rotatably mounted housing part enables optical monitoring of the parts which are accessible during processing.

For cost and stability reasons the rotatably mounted housing part is preferably provided with a steel lid.

BRIEF DESCRIPTION OF THE DRAWING

The invention will now be described in greater detail on the basis of the illustrative embodiment shown schematically in the figures. There is shown FIG. 1 a sectional representation of a first inventive embodiment of a machining center, FIG. 2 a perspective external view of the inventive machining center according to FIG. 1, FIG. 3 a perspective internal view of the inventive machining center according to FIG. 1, and FIG. 4 a perspective external view of a second inventive embodiment of a machining center.

DETAILED DESCRIPTION OF THE INVENTION

Figure 1:
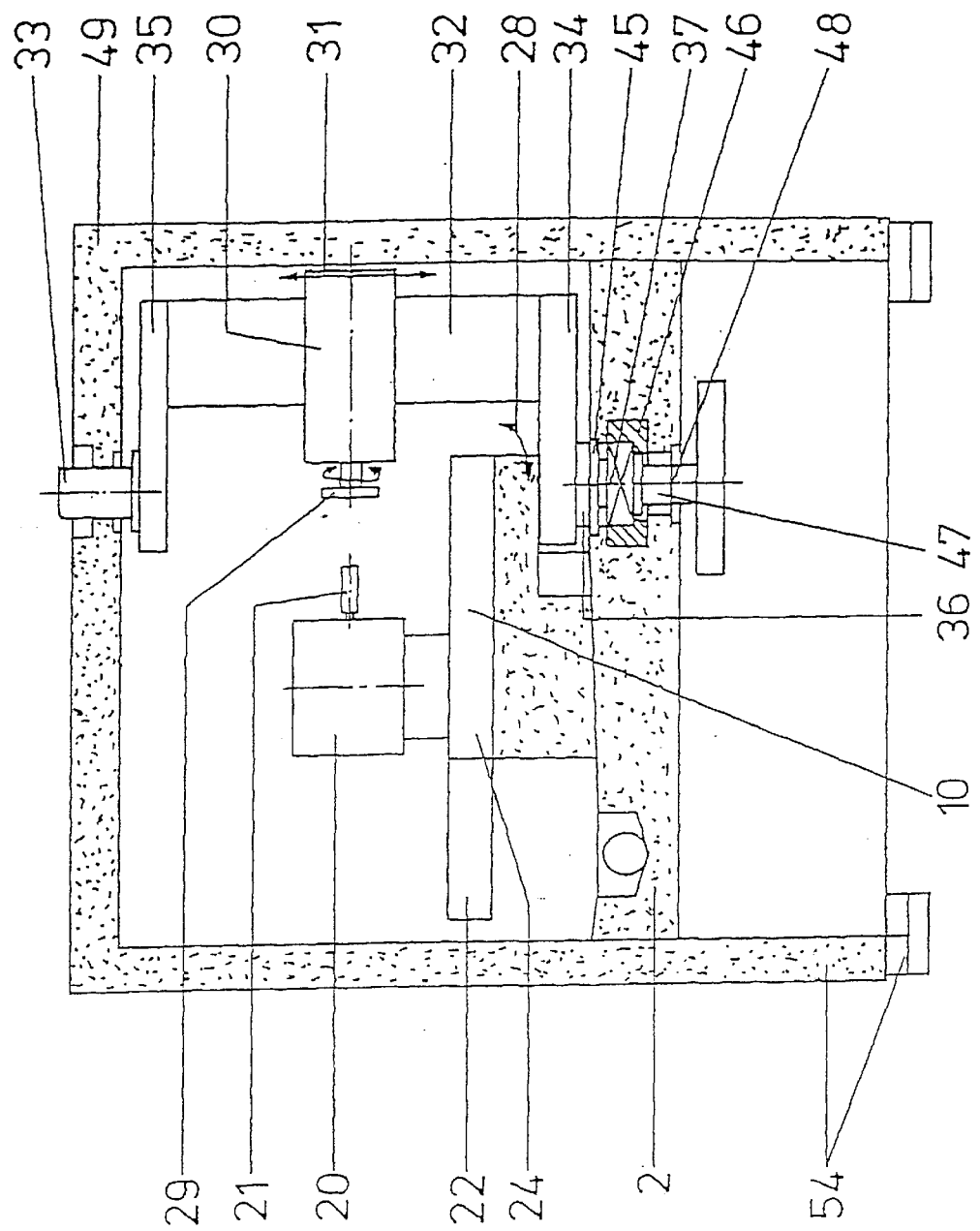
Figure 3:
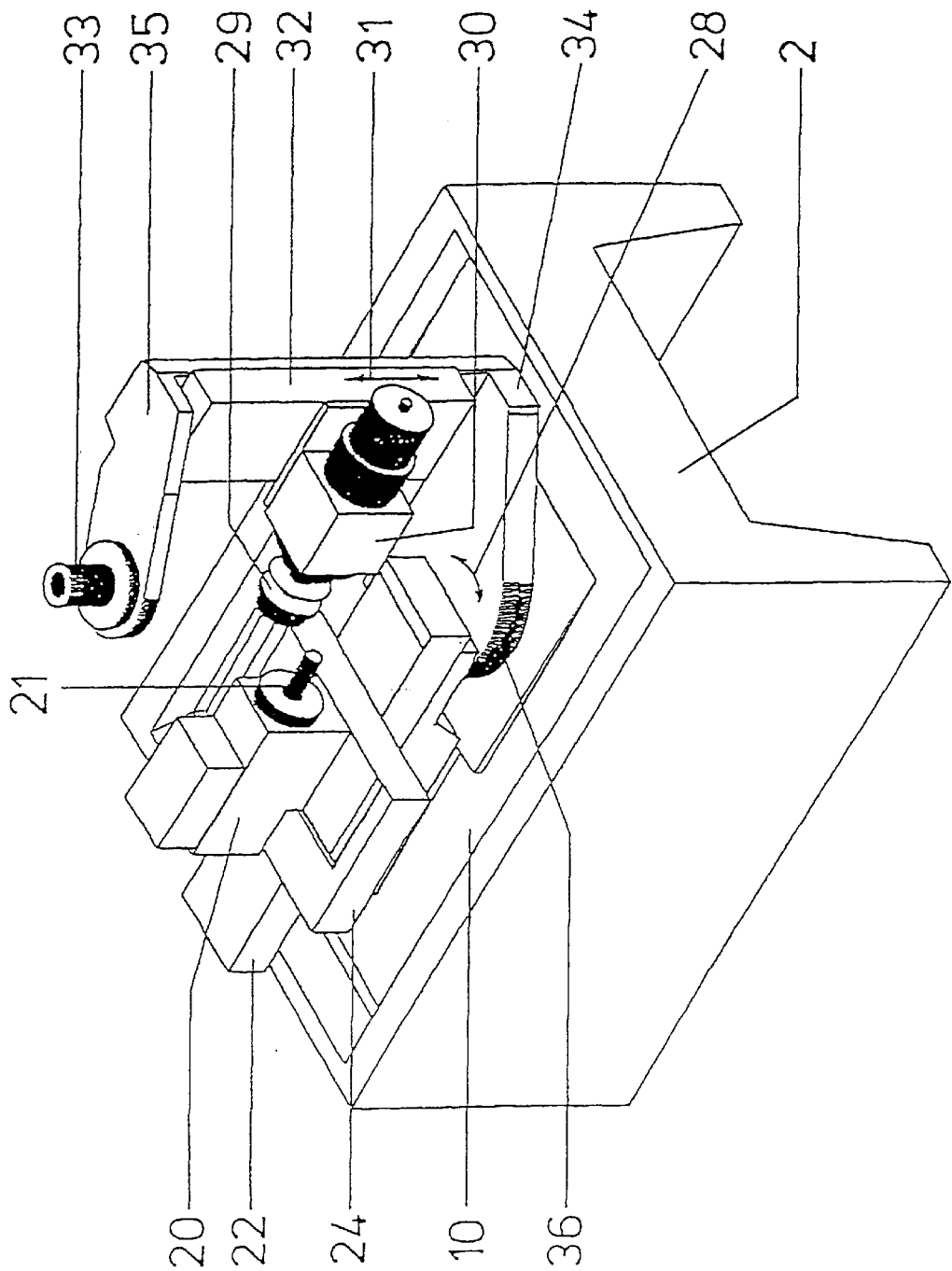

The machining center according to FIGS. 1 and 3 includes a machine stand 2 of a conventional design, which receives the various construction components or as the case may be construction subassemblies. The machine stand 2 supports a machine plate 10, which is arranged horizontally and is provided with a high precision flat milled planar surface. The working plate 10 extends essentially completely over the entire length of the machine stand 2 and is generally symmetrical relative to a longitudinally extending groove. The groove serves for securing a compound sled including a longitudinal support 22 and a transverse support 24, which receive the workpiece carrier 20. The workpiece carrier 20 can thus be moved both in the longitudinal as well as in the transverse direction. The workpiece carrier 20 receives a workpiece 21 to be machined, which could for example be a miller of which the cutting edges must be reground, or a workpiece which must itself be machined using a miller.

For this, a machining head 30 is provided, which is mounted height adjustable in known manner in a machining column 32. The height adjustability is indicated in the figure using a double arrow provided with the reference 31. The machining column 32 runs vertically and is mounted at one end of a first carrier arm 34. The opposite end of the first carrier arm 34 is coupled fixed against rotation with a rotary plate 36, which is mounted below the work plate 10 in the machine stand 2 in a mode and manner described below. The rotatable mounting is indicated with the aid of a double arrow provided with reference number 28.

By this mounting the machining column 32—and with it the machining head 30—can be pivoted about a vertical extending axis 37.

According to the figure, shaft 47 surrounded by a cast-in ring 46 and a sealing ring 45 is connected at the rotary plate 36 with a receiving flange 48 for a HD-drive, with which the rotation movement of the rotary plate 36 and therewith the machining column 32 can be accomplished.

The arrangement of the rotary plate 36 is so selected, that the rotation axis transects the axis of symmetry of the working plate 10 (perpendicular). Thereby the machining tool 29, which is mounted on the machining head 30 can be placed exactly in the rotation center and oriented centrally relative to the workpiece 21 to be machined. Beginning from this center-point a pivot movement symmetrical to both sides can be carried out, which makes possible in particular the machining of radiuses in the end surface area of the workpiece.

It is inventively envisioned, that above the machining head 30 in the axial extension of the axis 37 of the rotary plate 36 a mounting point 33 is located. In this mounting point 33 there is mounted a second carrier arm 35 for the machining column 32 and connected with the machining column 32. This second mounting point 33 is located in a recess 53 of a machine framework 49.

The length of the carrier arms 34 and 35 are so dimensioned, that they project beyond the machine stand 2 so far outwardly, that the described pivot movement can be carried out without impediment. Further, the machine stand 2 is so designed in the pivot area of the carrier arms 34 and 35, that beginning with the described central position of the machining head 30 or as the case may be the machining column 32 a pivot movement of 90° can be carried out to both sides, and therewith thus a total pivot of greater than 180°. The machining of the workpiece 21 is in principle possible from all sides, that is, also from below.

The various above described movements can occur manually as well as be controlled partially or completely automatically. Thus for example the pivot movement of the rotary plate 36 is possible via a HD-drive connected to a receiving flange 48. In analogous manner this applies also for the height adjustment of the machining head 30.

Figure 2:
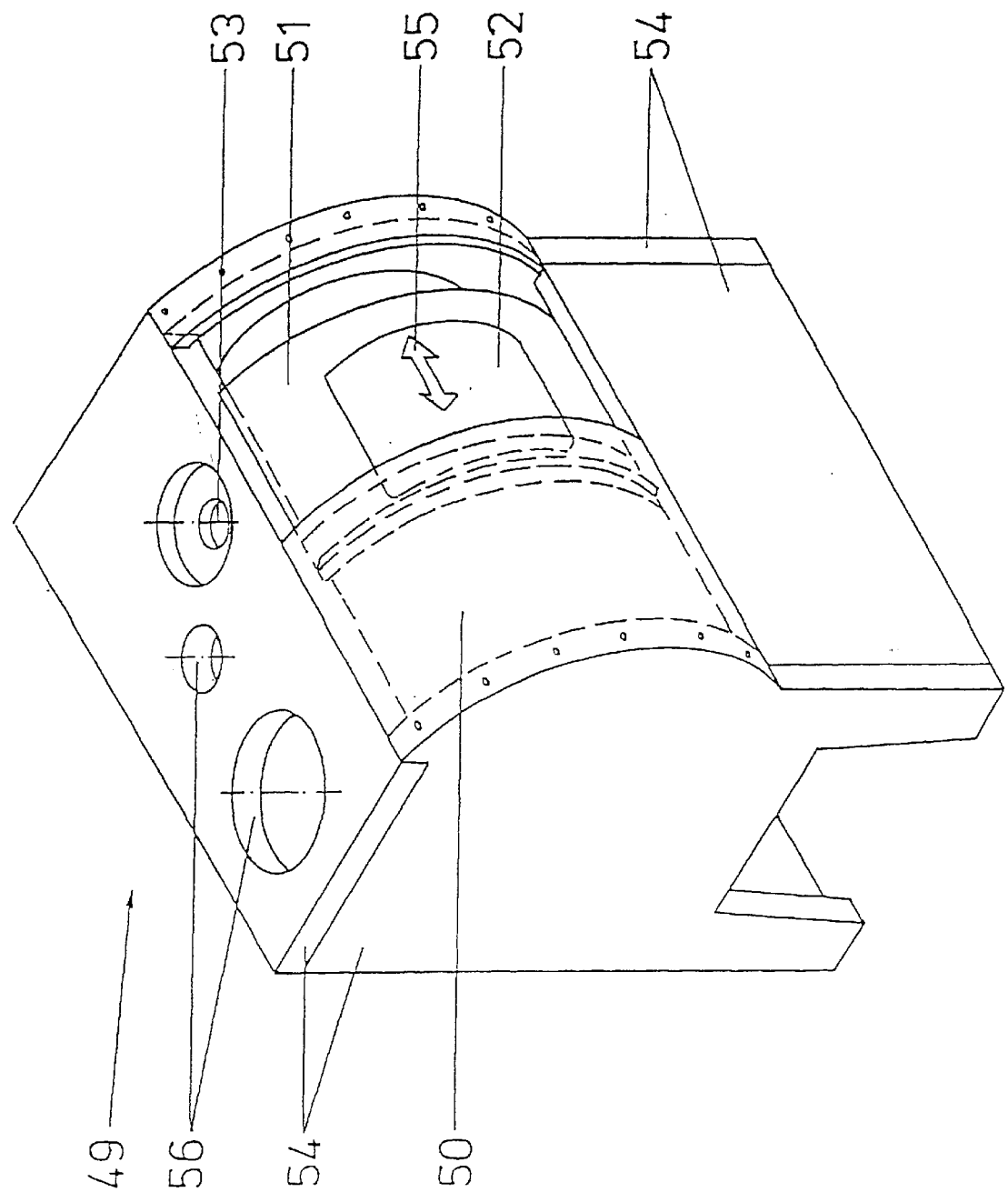

For demonstrating the integration of the machining center in the machine framework 49, reference is made to FIG. 2, which provides a perspective view. The machine frame 49 is comprised of multiple mineral cast components indicated with reference number 54. In the example the upper side of the machine frame 49 includes multiple recesses 56, through which for example supply cables or circuits, supply lines or the like for the operation of individual machine elements of the machining center or, as the case may be, for supplemental devices or tools, can pass through. Further, the upper part of the machine frame 49 also includes a recess 53 for receiving the mounting point 33 for the machining column 32. The front side of the machine frame 49 has in this example a covering 50 which can be dismantled and a sliding door 51. The covering 50 is for this reason made to be removable in order to make possible unimpeded access to the machine tool for servicing and/or repair purposes. The sliding door 51 is slideable in the horizontal direction (the direction of movement of the sliding door is indicated by the double arrow having reference number 55). This makes possible an optimal accessibility to the working area. In the example this is provided with a viewing window 52, so that the operator can at any time monitor the working process of the machining tool.

For achieving an optimal stiffness, the machine frame 49 in the example is constructed from mineral cast components 54, which are adhered and screwed to each other. Further, such mineral cast components 54 are economical to produce and further are characterized by their low weight.

Figure 4:
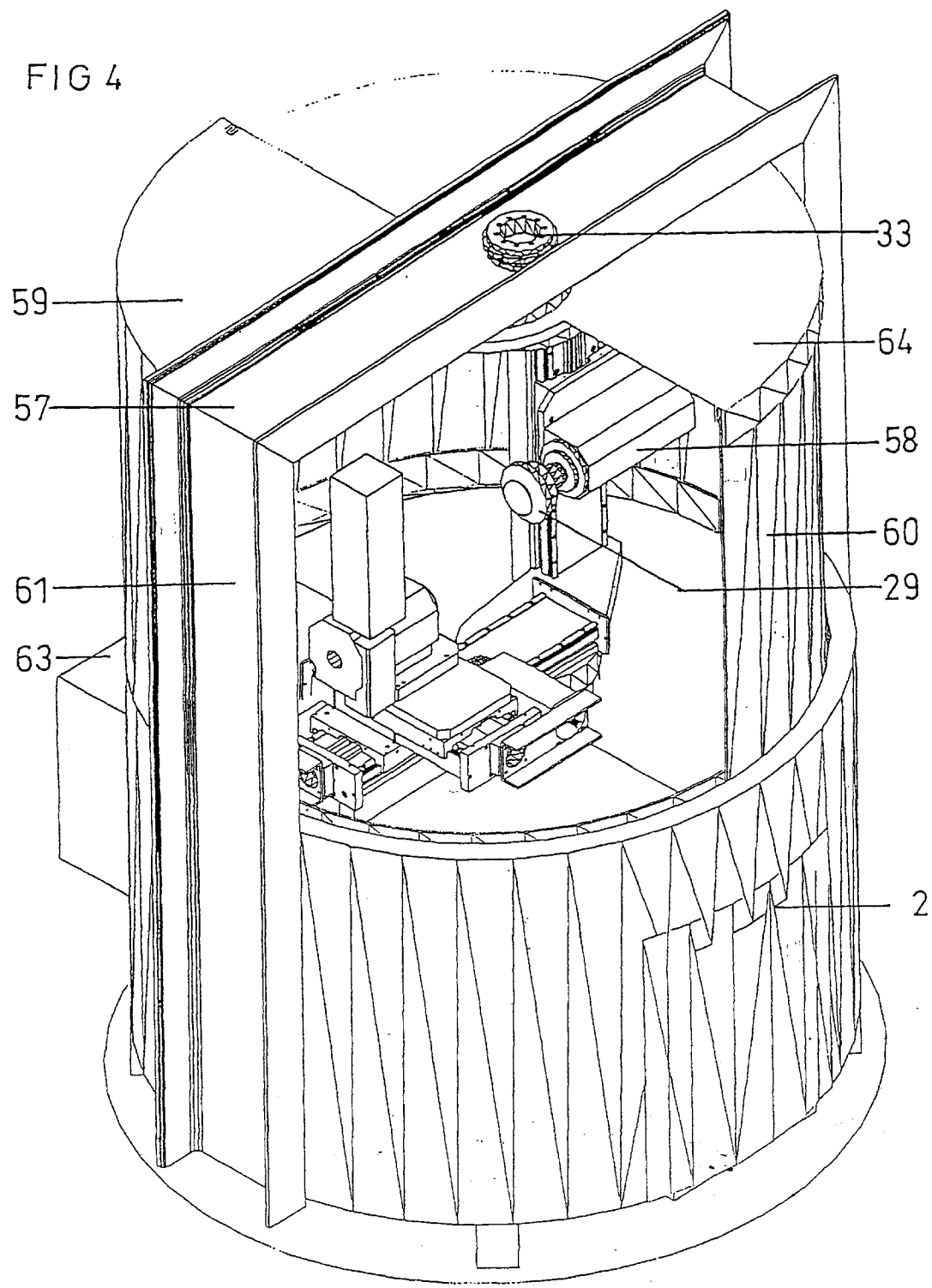

From the machining center according to FIG. 4 the machine stand 2 exhibits a known design, which receives the various construction elements or as the case may be construction subcomponents. This machine stand 2 is however not characterized by a quadrilateral design as in the previous example but rather is cylinder-shaped. It carries the above described construction elements and construction subcomponents, that is, in particular the working plate, the longitudinal support, the transverse support, the workpiece carrier, the workpiece, the machining head, the machining column, the rotary plate, the lower carrier arm, etc. For ease of understanding thus these individual components shown in FIG. 4 are not provided with their own individual reference numbers. It must however be simply noted, that the various components of the workpiece machining tool which can be seen in FIGS. 1 through 3 are likewise present.

Different from the machining center, which is shown in FIGS. 1 through 3, no machine frame 49 of the above described type is provided, rather, a steel bridge 57, which exhibits a mounting point 33 above the machining head 30 in the axial extension of the axis of the rotary plate, to which mounting point 33 the second carrier arm 35 is mounted, which is connected to the machining column 32 for the machining column 32. This steel bridge 57 essentially bridges over the machine stand 2, the work plate 10, the work piece carrier 20, the machining tool 29, the machining head 30, the machining column 32, the rotary plate 36 and the first and second carrier arm 34 and 35 in the embodiment shown in FIG. 4.

In this steel bridge 57 a cable channel 61 is provided, in which supply lines or circuits or the like can be received. A housing part 60 is rotatably mounted on the steel bridge 57. This rotatably mounted housing part 60, preferably made of MAKROLON, glass (fiberglass) or the like is in the shape of a segment of a cylinder casing, provided on its upper side with a steel lid 64. This (half) cylinder casing with steel lid 64 partially surrounds the work plate 10, the work piece carrier 20, the machining tool 29, the machining head 30, the machining column 32, the rotary plate 36 and the first and second carrier arms 34 and 35.

Beyond this the machining center includes a fixed housing part 59 preferably formed of sheet metal, which is likewise in the shape of a segment of a cylinder casing. The footprint of this cylinder casing is however slightly larger than the footprint of the rotatably mounted cylinder casing half of the housing part 60. In this manner it is possible, that this rotatably mounted housing part 60 is rotatable at least partially into the fixed housing part 59.

This rotatably mounted housing part 60 assumes the function of the above described viewing window 52, so that the operator can at any time monitor the work process of the machine tool.

REFERENCE NUMBER LIST

2 Machine stand
10 Machine plate
20 Workpiece carrier
21 Workpiece
22 Longitudinal support
24 Transverse support
28 Pivotability
29 Machining tool
30 Machining head
31 Height adjustability
32 Machining column
33 Mounting point
34 First carrier arm
35 Second carrier arm
36 Rotary plate
37 Axis
45 Seal
46 Cast-in ring
47 Shaft with receiving flange
48 Receiving flange for the HD-drive
49 Machine frame
50 Removable covering
51 Sliding door
52 Viewing window
53 Recess for mounting point
54 Mineral cast components
55 Movement direction of the sliding door
56 Recess
57 Steel bridge
58 Spindle motor
59 Fixed sheet-metal housing part
60 Rotatable mounted MAKROLON/glass housing part
61 Cable channel
63 Coolant reservoir
64 Steel lid

What is claimed is:

1. A machining center with a workpiece machine tool, said machining center comprising:
   a work plate (10) carried by a machine stand (2) and oriented essentially horizontally,
   workpiece carrier (20) seated upon the work plate (10) and adapted for receiving a workpiece (21),
   a machine tool (29) receiving machining head (30), which machining tool is mounted to a machining column (32), which column is oriented vertically and is pivotable about a vertical axis (37) via a rotary plate (36) which is located below the work plate (10) and integrated in the machine stand (2),
   a first carrier arm (34) for the machining column (32) having first and second ends, which at said first end is rigidly connected with the rotary plate (36) and which at said second end projects sideways beyond the work plate (10) in such a manner that the there-provided machining column (32) is pivotable about the work plate (10), and further comprising
   a mounting arrangement including a mounting point (33) located above the machining head (30) along an axial extension of the vertical pivot axis (37) of the rotary plate (36), to which a second carrier arm (35) for the machining column (32) is connected, the mounting arrangement in the form of a bridge (57) which essentially bridges over the machine stand (2) or a machine frame (49) which essentially surrounds the machine stand (2), the work plate (10), the workpiece carrier (20), the machining tool (29), the machine head (30), the machining column (32), the rotary plate (36) and the first and second carrier arms (34, 35).

2. A machining center according to claim 1, wherein the machine frame (49) comprises one or more mineral cast components (54).

3. A machining center according to claim 2, wherein the mineral cast components (54) are adhered to each other.

4. A machining center according to claim 2, wherein the mineral cast components (54) are screwed together.

5. A machining center according to claim 1, wherein the machine frame (49) includes a removable covering (50).

6. A machining center according to claim 1, wherein the machine frame (49) includes a sliding door (51).

7. A machining center according to claim 1, wherein the sliding door (51) includes a viewing window (52).

8. A machining center according to claim 5, wherein the bridge (57) includes a cable channel (61) adapted for receiving supply lines or circuits.

9. A machining center according to claim 5, wherein a housing part (60) is mounted rotatably on the bridge (57), which at least partially encompasses the work plate (10), the workpiece carrier (20), the machining tool (29), the machining head (30), the machining column (32), the rotary plate (36) and the first and second carrier arms (34, 35).

10. A machining center according to claim 9, wherein the rotatably mounted housing part (60) is in the shape of a segment of a cylindrical casing.

11. A machining center according to claim 7, wherein a fixed housing part (59) is provided, into which the rotatably mounted housing part (60) is at least partially rotatable.

12. A machining center according to claim 9, wherein the fixed housing part (59) is made of sheet metal.

13. A machining center according to claim 9, wherein the motor drive of the pivot arm is associated with the first carrier arm (34), so that the mounting location of the second carrier arm (35) is displaceable and thus able to compensate for tolerances which unavoidably occur during assembly.

14. A machining center according to claim 5, wherein the bridge (57) is made of steel.

15. A machining center according to claim 5, wherein the rotatably mounted housing part (60) is made of MAKROLON (polycarbonate) or glass (fiberglass).

16. A machining center according to claim 5, wherein the rotatably mounted housing part (60) includes a steel lid (64).

* * * * *